(12) United States Patent
Kronlund et al.

(10) Patent No.: US 7,917,589 B2
(45) Date of Patent: Mar. 29, 2011

(54) INSTANT MESSAGES WITH PRIVACY NOTICES

(75) Inventors: Curtis Duane Kronlund, Cottage Grove, MN (US); Scott Alan Moore, Rochester, MN (US); Gregory Allan Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/467,069

(22) Filed: Aug. 24, 2006

(65) Prior Publication Data

US 2008/0052759 A1 Feb. 28, 2008

(51) Int. Cl.
*G06F 21/00* (2006.01)
(52) U.S. Cl. ............ 709/206; 455/411; 455/412.1; 455/412.2
(58) Field of Classification Search ............ 709/206; 713/201; 715/767; 705/1
See application file for complete search history.

(56) References Cited

U.S. PATENT DOCUMENTS

| 5,995,101 A * | 11/1999 | Clark et al. ............ 715/767 |
| 6,807,565 B1 * | 10/2004 | Dodrill et al. ............ 709/206 |
| 2003/0023451 A1 * | 1/2003 | Willner et al. ............ 705/1 |
| 2003/0123629 A1 * | 7/2003 | Hussain et al. ............ 379/142.05 |
| 2004/0078595 A1 * | 4/2004 | Kent et al. ............ 713/201 |
| 2004/0143633 A1 * | 7/2004 | McCarty ............ 709/206 |

* cited by examiner

*Primary Examiner* — Brandon S Hoffman
*Assistant Examiner* — Thong Truong
(74) *Attorney, Agent, or Firm* — Owen J. Gamon

(57) ABSTRACT

In an embodiment, an instant message is received that includes data, a privacy indication, and an override indication. In an embodiment, if the privacy indication specifies that the data is non-private, then the data is presented. But, if the privacy indication specifies that the data is private, then a privacy notice is presented and the data is hidden until an acknowledgment of the privacy notice is received. The privacy notice may include a prompt for the acknowledgment. In an embodiment, if the privacy indication specifies that the data is private and the override indication allows the privacy indication to be overridden, the data is presented. In another embodiment, if the privacy indication specifies that the data is private, the override indication allows the privacy indication to be overridden, and a time period since a user interface device received input is less than a threshold amount of time, then the data is presented.

18 Claims, 11 Drawing Sheets

INSTANT MESSAGES WITH PRIVACY NOTICES

FIELD

An embodiment of the invention generally relates to instant messages. In particular, an embodiment of the invention generally relates to protecting instant messages with privacy notices.

BACKGROUND

Years ago, computers were isolated devices that did not communicate with each other. But today, computers are often connected in networks. One such network is the Internet or World Wide Web, in which electronic document transfer and message communication such as forums (pages that contain posts submitted by users known as posters), electronic mail (email), and instant messaging are commonplace.

Instant messaging allows a user at an electronic device to send a message over a network to another user that is concurrently connected to the network. With instant messaging, a user has a contact list that includes the names or identifications of other users with whom communication may be desired in the future. When users identified in the contacts list connect to the network, the user is notified of their presence, so that an interactive chat session may begin if desired. During the interactive chat session, the instant messages between users are immediately routed to the users' electronic devices and displayed on a pop-up window or display area. In this way, two or more users may converse with one another in a simulated real-time manner through messages.

Instant messaging differs from other forms of electronic communication, such as email and forum posts in several important ways. First, instant messaging requires that the sender and receiver are concurrently connected to the network, but email and forum posts have no such requirement. Second, email and forum posts require the existence of separate servers (an email server and a page server, respectively), which are computer systems that store the electronic communication for later retrieval. Third, email and forum posts require the receiver to connect to the separate server and retrieve the email or pages of posts, which a receiver either performs periodically (e.g. on a scheduled basis, such as every few minutes), or only in response to an explicit user request, such as a request to retrieve email or download a page of posts. In contrast, an instant messaging client at the receiver need only monitor a port at the receiver for incoming instant messages, so instant messages are received faster and with less receiver processing power than required for email and forum posts.

Some forums provide a service to their registered users that the forum documentation might call an "inbox," a "private message," or an "instant message," but which is actually a personal forum post that may be retrieved only by a specified intended user or users, as opposed to public forum posts that may be retrieved by all users or all registered users. An example of documentation for the support for such a personal forum post is described in "Broadband>>Site FAQ 4.4 Instant Messages" (http://www.dslreports.com/faq/site/4.4%20Instant%20Messages). Personal forum posts are not true instant messages because the poster may post them to the forum server regardless of whether the specified intended user(s) are online or connected to the forum server, the personal posts are stored at the forum server and may only be retrieved by the intended user(s) via a time-consuming explicit request to the forum server for a page, and the poster may delete the personal forum post subsequent to posting it.

The unique features of instant messages (as opposed to email and forum posts, whether public or personal) provide users with the ability to engage in a near real-time conversation, which is very appealing to users. But, the advantageous features of instant messages can also provide problems. Users often initiate an instant messaging session in the morning, and leave it enabled all day, so that anyone in their contact list can send them instant messages at any time. Thus, users need not take further action to receive instant messages, which simply appear or pop up on their display screen for anyone present to view. Other people besides the intended user may be present because they entered the room while the intended user was engaged in an instant messaging conversation, because the intended user left the computer unattended, or because the intended user forgot to disable instant messaging while using the computer for a presentation at a meeting. But, some instant messages are confidential or private in nature, and disclosure to others may be inappropriate, embarrassing, harmful to the sender and/or intended receiver, or a violation of a duty to protect information owned by an employer, customer, or client.

Thus, an enhanced technique to needed to protect private information in instant messages.

SUMMARY

A method, apparatus, system, and signal-bearing medium are provided. In an embodiment, an instant message is received that includes data, a privacy indication, and an override indication. In an embodiment, if the privacy indication specifies that the data is non-private, then the data is presented. But, if the privacy indication specifies that the data is private, then a privacy notice is presented and the data is hidden until an acknowledgment of the privacy notice is received. The privacy notice may include a prompt for the acknowledgment. The override indication specifies whether the privacy indication may be overridden. In an embodiment, if the privacy indication specifies that the data is private and the override indication allows the privacy indication to be overridden, then the data is presented. In another embodiment, if the privacy indication specifies that the data is private, the override indication allows the privacy indication to be overridden, and if a time period since a user interface device received input is less than a threshold amount of time, then the data is presented. In another embodiment, if the privacy indication specifies that the data is non-private, the override indication allows the privacy indication to be overridden, and if a time period since a user interface device received input is greater than a threshold amount of time, then the privacy notice is presented and the data is hidden. In this way, private information in instant messages may be protected.

DETAILED DESCRIPTION

Figure 1:
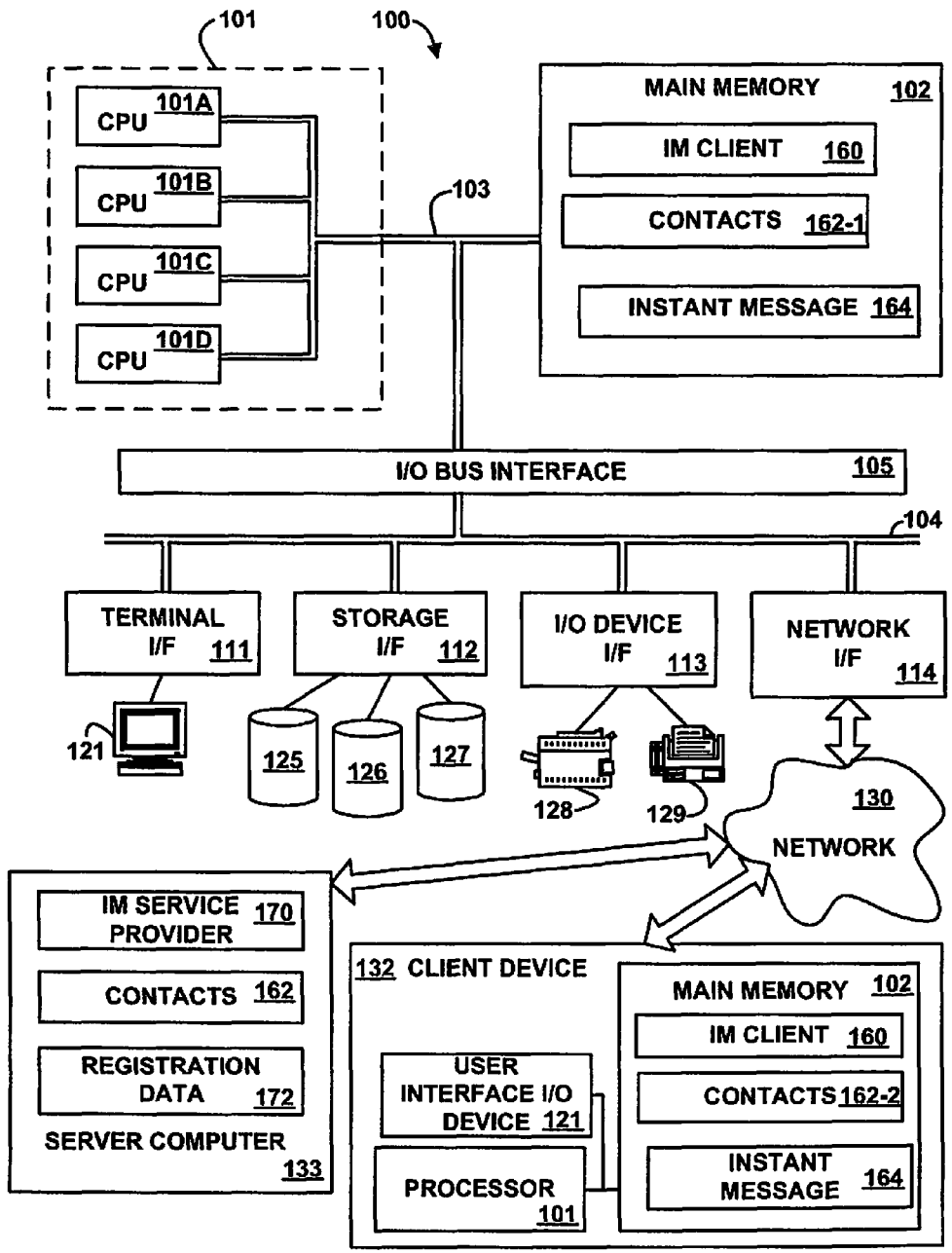
FIG. 1 depicts a block diagram of an example system for implementing an embodiment of the invention.

Referring to the Drawings, wherein like numbers denote like parts throughout the several views, FIG. 1 depicts a high-level block diagram representation of client devices 100 and 132 connected via a network 130 to a server computer 133, according to an embodiment of the present invention. The terms "client" and "server" are used herein for convenience only, and in an embodiment, an electronic device that acts as a client in one embodiment may act as a server in another embodiment, and vice versa.

The major components of the client device 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The client device 100 contains one or more general-purpose programmable central processing units (CPUs) 101A, 101B, 101C, and 101D, herein generically referred to as the processor 101. In an embodiment, the client device 100 contains multiple processors typical of a relatively large system; however, in another embodiment the client device 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the client device 100, and may also include the virtual memory of other computer systems coupled to the client device 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The memory 102 includes or stores an instant messaging client 160, contacts 162-1, and an instant message 164. Although the instant messaging client 160, the contacts 162-1, and the instant message 164 are illustrated as being stored within the memory 102 in the client device 100, in other embodiments some or all of them may be on different computer systems and may be accessed remotely, e.g., via the network 130. The client device 100 may use virtual addressing mechanisms that allow the programs of the client device 100 to behave as if they only have access to a large, single storage entity instead of access to multiple, smaller storage entities. Thus, while the instant messaging client 160, the contacts 162-1, and the instant message 164 are illustrated as being contained within the main memory 102, these elements are not necessarily all completely stored in the same storage device at the same time. Further, although the instant messaging client 160, the contacts 162-1, and the instant message 164 are illustrated as being separate entities, in other embodiments some of them, portions of some of them, or all of them may be packaged together.

The instant messaging client 160 at the client device 100 is an application that allows a user at the client device 100 to establish contact information (the contacts 162-1) regarding other users and/or user identifications with which instant message communication is desired. The instant messaging client 160 at the client device 100 further enables the sending and receiving of the instant message 164 to other client devices, e.g., the client device 132, via the network 130. The instant messaging client 160 at the client device 100 includes instructions capable of executing on the processor 101 or statements capable of being interpreted by instructions executing on the processor 101 to perform the functions as further described below with reference to FIGS. 7, 8, 9, 10, and 11. In another embodiment, the instant messaging client 160 may be implemented in microcode or firmware. In another embodiment, the instant messaging client 160 may be implemented in hardware via logic gates and/or other appropriate hardware techniques in lieu of or in addition to a processor-based system.

The instant message 164 may include text messages, optional file attachments, graphics, or video that are capable of being transmitted over the network 130 between the client devices 100 and 132. The instant message 164 is further described below with reference to FIG. 6.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology.

The I/O interface units support communication with a variety of storage and I/O devices. For example, the terminal interface unit 111 supports the attachment of one or more user interface I/O devices 121. In various embodiments, the user interface I/O device 121 may be a video terminal capable of displaying information, a keyboard, a mouse, a track ball, a track pad, a microphone, a speaker, a pointing device, any other appropriate device capable of presenting information to a user and/or receiving information from a user, or any portion, multiple, or combination thereof.

The storage interface unit 112 supports the attachment of one or more storage devices 125, 126, and 127, such as direct access storage devices (DASD), which are typically rotating magnetic disk drive storage devices, although they could alternatively be other devices, including arrays of disk drives configured to appear as a single large storage device to a host. In other embodiments, the storage devices 125, 126, and/or 127 may be diskette devices, tape devices, removable media, non-removable media, optical media, or any other appropriate storage devices. The contents of the main memory 102 may be stored to and retrieved from the storage devices 125, 126, and 127, as needed.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the client device 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the client device 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The network 130 may be any suitable network or combination of networks and may support any appropriate protocol suitable for communication of data and/or code to/from the client device 100, the client device 132, and/or the server computer 133. In various embodiments, the network 130 may represent a storage device or a combination of storage devices, either connected directly or indirectly to the client device 100, the client device 132, and/or the server computer 133. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network.

In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present. The network 130 may include any number of intermediate servers, routers, or other electronic devices that operate to receive and send the instant messages 164, packets, data, requests, and/or responses, in any appropriate form between the client device 100, the client device 132, and/or the server computer 133.

The client device 132 may include some or all of the hardware and/or software elements previously described above for the client device 100. Although the client device 132 is illustrated as being separate from the client device 100, in other embodiments, the client devices 100 and 132 may be implemented as part of the same electronic device. The client device 132 includes a memory 102 connected (directly or indirectly) to a processor 101 and a user interface I/O device 121. The memory 102 in the client device 132 stores or encodes an instant messaging client 160, contacts 162-2, and an instant message 164. The instant messaging client 160 at the client device 132 is an application that allows a user at the client device 132 to establish contact information (the contacts 162-2) regarding other users and/or user identifications with which instant message communication is desired. The instant messaging client 160 at the client device 132 further enables the sending and receiving of the instant messages 164 to other client devices, e.g., the client device 100, via the network 130. The instant messaging client 160 at the client device 132 includes instructions capable of executing on the processor 101 or statements capable of being interpreted by instructions executing on the processor 101 to perform the functions as further described below with reference to FIGS. 7, 8, 9, 10, and 11. In another embodiment, the instant messaging client 160 at the client device 132 may be implemented in microcode or firmware. In another embodiment, the instant messaging client 160 at the client device 132 may be implemented in hardware via logic gates and/or other appropriate hardware techniques in lieu of or in addition to a processor-based system.

The contacts 162-2 may include the same or different information than the contacts 162-1, depending on whether the users at the client devices 100 and 132 that use the contacts 162-1 and 162-2 have the same or different contacts. For example, in an embodiment, a company may provide an instant messaging system to its employees, where all users have all contact information for all users within the company. In another embodiment, a user may only have contact information for those users that have explicitly given out their contact information. In another embodiment, users may have a combination of common and unique contacts.

The server computer 133 may include some or all of the hardware and/or software elements previously described above for the client device 100. The server computer 133 includes an instant messaging service provider 170, contacts 162, and registration data 172, which represents instructions and/or data encoded in memory or storage device(s). The instant messaging service provider 170 monitors the network 130 to determine if any of the users in the registration data 172 are currently logged onto the network and sends notifications to instant messaging clients 160 if any of the users in the contacts 162 associated with those instant messaging clients 160 are currently active on the network. In an embodiment, the instant messaging service provider 170 may be implemented as part of an Internet Service Provider (ISP), but in other embodiments, the instant messaging service provider 170 may be implemented as part of any appropriate service.

In an embodiment, the contacts 162 includes all of the contacts for all of the registered users, such as both the contacts 162-1 and the contacts 162-2. In another embodiment, the contacts 162 includes all of the contacts for all of the registered users who are online.

In an embodiment, the instant messaging service provider 170 acts as an intermediary for instant messages 164, and the sending instant messaging client 160 sends instant messages 164 to the instant messaging service provider 170. Upon receipt of the instant message 164, the instant messaging service provider 170 looks-up the intended recipient in the registration data 172, determines the appropriate routing information for the intended recipient, adds the routing information to the instant message 164, and forward the instant message 164 to the network 130.

In another embodiment, the instant messaging service provider 170 does not act as an intermediary. Instead, the instant messaging clients 160 receive routing information for the users in their respective contacts 162-1 or 162-2 from the instant messaging service provider 170 when the instant messaging clients 160 log on or initiate a session with the instant messaging service provider 170. The instant messaging clients 160 then add the appropriate routing information to the instant messages 164 for the intended recipient and send the instant message to the recipient instant messaging client 160 via the network 130.

In an embodiment, the server computer 133 is optional, does not exit, or is not used, and the features of the instant messaging service provider 170, the contacts 162, and the registration data 172 are provided by the client devices 100 and 132. With this embodiment, the user is registered with the local instant messaging client 160 by providing the necessary information for identifying the user and a list of user identifications of users with which communication is sought. Thus, with this embodiment, registration with a remotely located instant messaging service provider 170 is not necessary for an embodiment of the present invention to operate.

In various embodiments, the instant messaging clients 160 and the instant messaging service provider 170 may utilize a message model, in which no explicit association exists between instant messages 164, or a session model, in which instant messages 164 are associated in an explicit conversation that has a beginning and an end. In various embodiments, the instant messaging clients 160 and the instant messaging service provider 170 may conform to RFC (Request for Comments) 2778, 2779, 3428, SIP (Session Initiation Protocol), SIMPLE (SIP for Instant Messaging and Presence Leveraging Extensions), APEX (Application Exchange), Prim (Presence and Instant Messaging Protocol), XMPP (Extensible Messaging and Presence Protocol), IMPS (Instant Messaging and Presence Service), or any other appropriate model or protocol.

In an embodiment, certain hardware components of the client device 100, the client device 132, and/or the server computer 133 may be implemented by an eServer iSeries computer system available from International Business Machines Corporation of Armonk, N.Y. In various embodiments, any, some, or all of the client device 100, the client device 132, and/or the server computer 133 may be a single-user system, typically containing only a single user display and keyboard input, or a multiple-user system that servers any number of users or user terminal. In an embodiment, any, some, or all of the client device 100, the client device 132, and/or the server computer 133 may be a server or similar device that has little or no direct user interface, but receives requests from other computer systems (clients). In other embodiments, any, some, or all of the client device 100, the client device 132, and/or the server computer 133 may be implemented as a mainframe computer, personal computer, portable computer, laptop or notebook computer, workstation, PDA (Personal Digital Assistant), tablet computer, pocket computer, telephone, pager, alphanumeric pager, automobile, teleconferencing system, or any portion, combination, or multiple thereof. But, those skilled in the art will appreciate that the mechanisms and apparatus of embodiments of the present invention apply equally to any appropriate electronic device.

It should be understood that FIG. 1 is intended to depict the representative major components of the client device 100, the network 130, the client device 132, and the server computer 133 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the client device 100 and/or the client device 132, and that, when read and executed by one or more processors 101 in the client device 100 and/or the client device 132, cause the client device 100 and/or the client device 132 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the client device 100 and 132 via a variety of tangible signal-bearing media that may be operatively or communicatively connected (directly or indirectly) to the processor 101. The signal-bearing media may include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
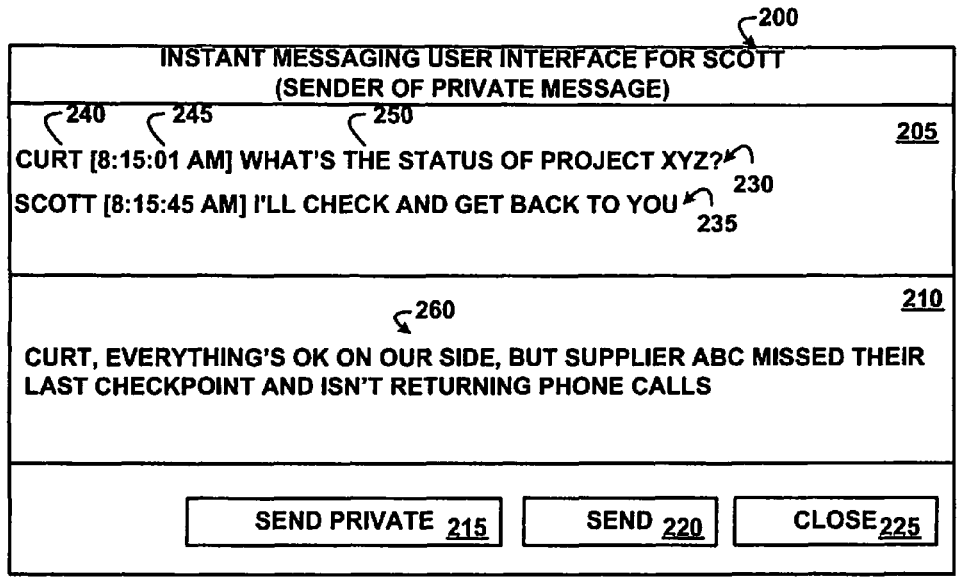
FIG. 2 depicts a block diagram of an example user interface at a client for sending a private instant message, according to an embodiment of the invention.

FIG. 2 depicts a block diagram of an example user interface 200 at a client device 100 or 132 for sending a private instant message 164, according to an embodiment of the invention. The example user interface 200 is associated with a user ("Scott" in this example) that desires to send an instant message 164. The instant messaging client 160 may present the example user interface 200 via the user interface I/O device 121 connected to the client device 100 or 132. The user interface 200 includes a transcript field 205, a message input field 210, a send private command 215, a send command 220, and a close command 225.

The transcript field 205 presents previous instant messages 164, both those that the user ("Scott" in this example) associated with the user interface 200 has previously sent and those that the user has previously received. In various embodiments, the transcript field 205 may include previously sent/received instant messages 164 (or portions thereof) to/from one other user or to/from multiple other users, such as the example instant messages 230 and 235. The example instant message 230 was previously sent by the user associated with the user interface 200, and the example instant message 235 was previously received by the user associated with the user interface 200. The example instant message 230 includes a sender identification 240 that identifies the sender, a time 245, which may be the time and/or date the instant message 230 was sent or the time and/or date that the instant message 230 was received. The example instant message 230 further includes data 250 entered by the sender.

The message input field 210 receives data 260 that the user associated with the user interface 200 desires to send. The user may enter data 260 into the message input field 210 via the user interface I/O device 121, e.g., by typing on a keyboard, speaking into a microphone and utilizing a speech-recognition application, selecting words or characters via a pointing device, or any other appropriate technique for inputting data. Although the message input field 210 in FIG. 2 illustrates textual data, in other embodiments, the inputted data may include attached video, audio, images, or any combination or multiple thereof. The sending user may select a recipient user to receive the instant message 164 that contains the data 260 entered into the input field 210 from the contacts (e.g., the contacts 162-1 or 162-2, depending on the client device 100 or 132 being used by the sending user).

The send private command 215 (if selected by the sending user) instructs the instant messaging client 160 of the sender to send the data 260 in an instant message 164 to a selected recipient and include with the instant message 164 a privacy indication that specifies that the data 260 is private and requests that the instant messaging client 160 of the recipient should protect the data 260 by hiding (not presenting or displaying) the data and instead presenting or displaying a privacy notice that explains that the data 260 is private. The send command 220 (if selected by the sending user) instructs the instant messaging client 160 of the sender to send the data 260 in an instant message 164 to a selected recipient and include with the instant message 164 a privacy indication that specifies that the data 260 is not private and requests that the instant messaging client 160 of the recipient need not protect or hide the data 260 and need not present a privacy notice. Private and non-private are different security classifications for data, and private data is more confidential or has a higher security classification than non-private data.

The close command 225 (if selected by the sending user) instructs the instant messaging client 160 of the sender to close the instant messaging session and stop monitoring for instant messages 164. The commands 215, 220, and 225 may be implemented via buttons, menu options, dialogs, speech recognition, or any other appropriate user interface technique.

Figure 3A:
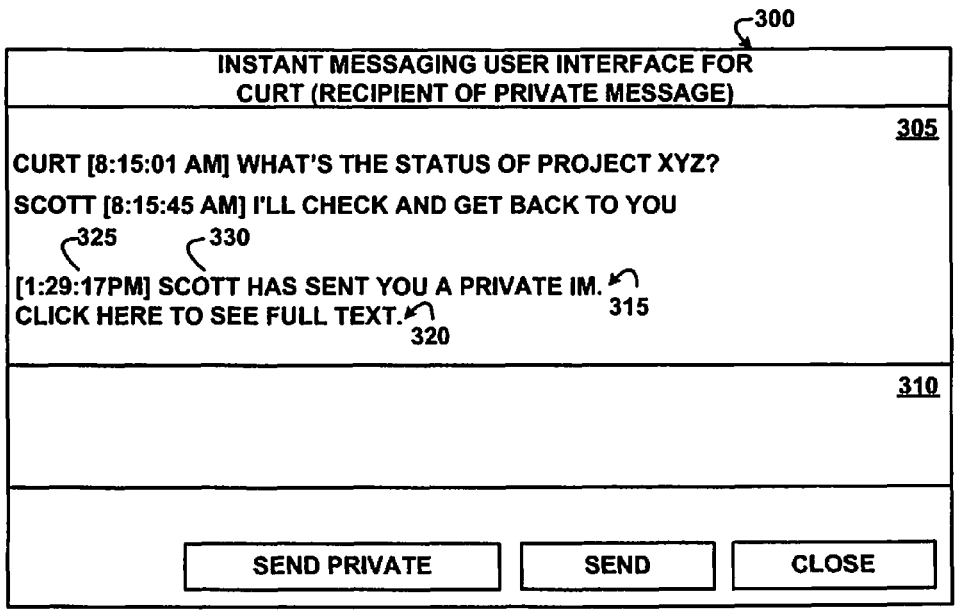
FIG. 3A depicts a block diagram of an example user interface at a client with a privacy notice, according to an embodiment of the invention.

FIG. 3A depicts a block diagram of an example user interface 300 at a recipient client device that has a privacy notice 315, according to an embodiment of the invention. The instant messaging client 160 may present the example user interface 300 via the user interface I/O device 121 connected to the client device 100 or 132. The example user interface 300 is associated with a user ("Curt" in this example) that has received an instant message that has a privacy notice 315 displayed instead of the data of the instant message, i.e., the data is hidden or not displayed. The user interface 300 includes a transcript field 305 and a message input field 310. The transcript field 305 presents instant messages, or portions thereof, both those that the user associated with the user interface 300 has previously sent and those that the user has previously received.

The instant messaging client 160 of the recipient client device 100 or 132 chose to identify the received instant message by identifying the time 325 that the instant message was received (or sent) and by identifying the sender 330 of the received instant message in the transcript field 305. But the instant messaging client 160 did not present the data of the received instant message to the recipient user; instead, the instant messaging client 160 chose to keep the data unavailable and present the privacy notice 315 to the recipient user, which informed the recipient user that the received instant message contains private or confidential data. The instant messaging client 160 at the recipient client device 100 or 132 chose to present the privacy notice 315 instead of the data in the received instant message in response to the contents of a privacy indication in the received instant message, based on an override indication in the received instant message, and/or based on privacy options set by the user via a user interface at the recipient client device, as further described below with reference to FIGS. 4 and 10. The privacy notice 315 includes an acknowledgment prompt 320, which prompts the recipient user for an acknowledgment command, which is a request to present the data of the received instant message. In various embodiments, the user may initiate an acknowledgment command via the user interface I/O device 121, by clicking or otherwise selecting the acknowledgment prompt 320, by moving a cursor or other pointer over or near the privacy notice 315 or the acknowledgment prompt 320, or via another other appropriate technique.

The recipient instant messaging client 160 receives the acknowledgment command, which represents that the recipient user has acknowledged the privacy notice 315 and requests to view the data of the received instant message, which has thus far been hidden from the recipient and is has not yet been presented. In response to the acknowledgement command, the recipient instant messaging client 160 presents or displays the data of the private instant message, as further described below with reference to FIG. 3B.

Figure 3B:
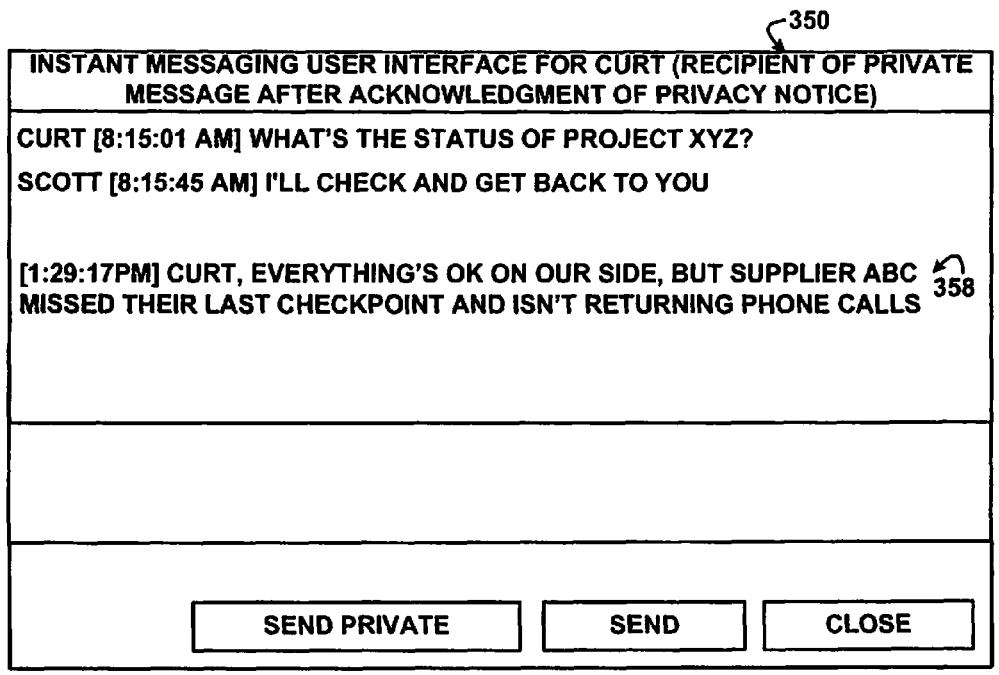
FIG. 3B depicts a block diagram of an example user interface at a client after acknowledging the privacy notice, according to an embodiment of the invention.

FIG. 3B depicts a block diagram of an example user interface 350 at a recipient client device after the instant messaging client has received an acknowledgement of a privacy notice 315 (FIG. 3A), according to an embodiment of the invention. The recipient instant messaging client 160 presents the example user interface 350 via the user interface I/O device 121 connected to the client device 100 or 132. The example user interface 350 is associated with a user ("Curt" in this example) that has received an instant message that was presented with a privacy notice 315 (FIG. 3A).

In response to receiving an acknowledgment of the privacy notice 315 (FIG. 3A), the recipient instant messaging client 160 presents the data 358 (FIG. 3B) of the private instant message, which was entered as the data 260 (FIG. 2) by the sending user. The recipient instant messaging client 160 presents the data 358 via the user interface I/O device 121. In various embodiments, the recipient instant messaging client 160 presents the data 358 by either partially or completely replacing or overwriting the privacy notice 315 and/or the acknowledgment prompt 320 with the data 358. In another embodiment, the recipient instant messaging client 160 displays the data 358 in addition to the privacy notice 315 and/or the acknowledgment prompt 320 without replacing or overwriting either or both of them. In various embodiments, the recipient instant messaging client 160 presents the data 358 in a same or different window as the privacy notice 315 and the acknowledgment prompt 320. In various embodiments, the recipient instant messaging client 160 presents the data 358 in a popup message or window, in a balloon message, in a mouse-over message, a fly-over message, or fly-out message, via an audio speaker, or via any other appropriate technique. In various embodiments, the recipient instant messaging client 160 removes the data 358 from the video display screen after a period of time has elapsed since the data 358 was displayed, in response to the cursor or pointer moving away from the privacy notice 315 and/or the acknowledgment prompt 320, or in response to a request from the user. The recipient instant messaging client 160 may restore none, a portion of, or all of the privacy notice 315 and/or the acknowledgment prompt 320 after removing the data 358.

Figure 3C:
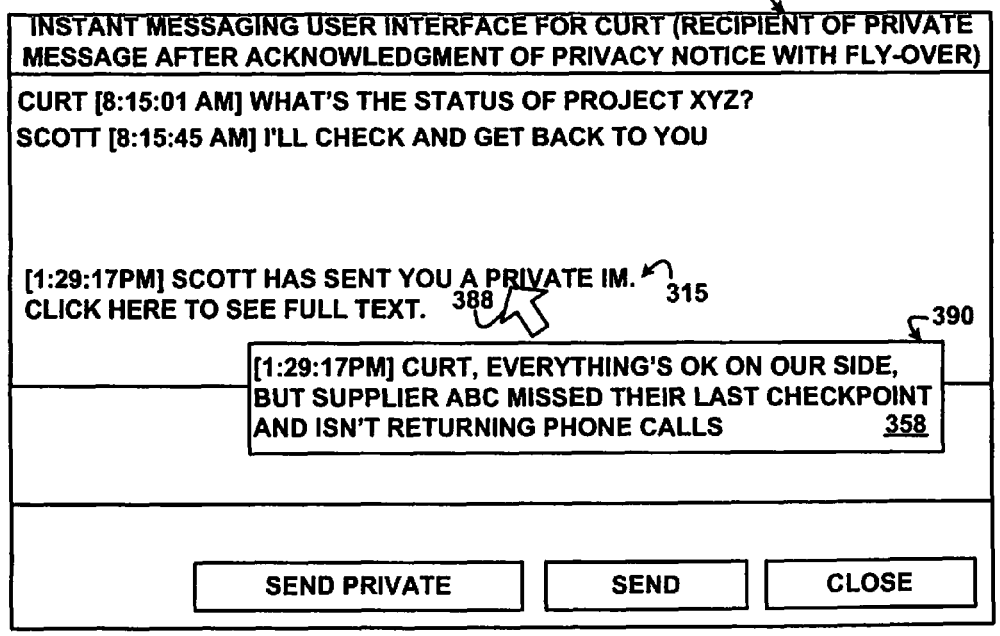
FIG. 3C depicts a block diagram of an example user interface at a client with a fly-over message, according to an embodiment of the invention.

FIG. 3C depicts a block diagram of an example user interface 370 at a recipient client device with a fly-over message 390, according to an embodiment of the invention. The instant messaging client 160 presents the example user interface 370 via the user interface I/O device 121 connected to the client device 100 or 132. The example user interface 370 is associated with a user ("Curt" in this example) that received an instant message that has a privacy notice 315 displayed instead of the data of the instant message, i.e., the data of the instant message is hidden or not displayed.

The user interface 370 includes a cursor 388 (also known as a pointer) that the user may move to various locations on a video display via the user interface I/O device 121. In response to the cursor 388 being located at, positioned at, over, or near the privacy indication 315, the instant messaging client 160 presents the fly-over message 390, which includes the data 358 of the instant message that was previously hidden. Thus, the instant messaging client 160 interprets the location of the cursor 388 at the privacy indication 315 as an acknowledgement command. In an embodiment, the instant messaging client 160 receives notification of the location of the cursor 388 and the location of the privacy notification 315, compares the locations, determines if the location of the cursor 388 is within a threshold distance of the privacy notification 315, and if the locations are within the threshold distance, displays the fly-over message 390 with the data 358. Fly-over messages are also called fly-over text, fly-out messages (or text), balloon messages (or text), or mouse-over messages (or text).

In an embodiment, the recipient instant messaging client 160 removes the fly-over message 390 (which also removes the included data 358) from the video display screen after a period of time has elapsed since the fly-over message 390 was displayed. In another embodiment, the recipient instant messaging client 160 removes the fly-over message 390 in response to the cursor 388 moving away from the privacy notice 315. If the display of the fly-over message 390 obscured any previously-displayed data (e.g., the privacy notice 315) on the video screen, then the recipient instant messaging client 160 may restore the previously-displayed data after removing the fly-over message 390.

Figure 4A:
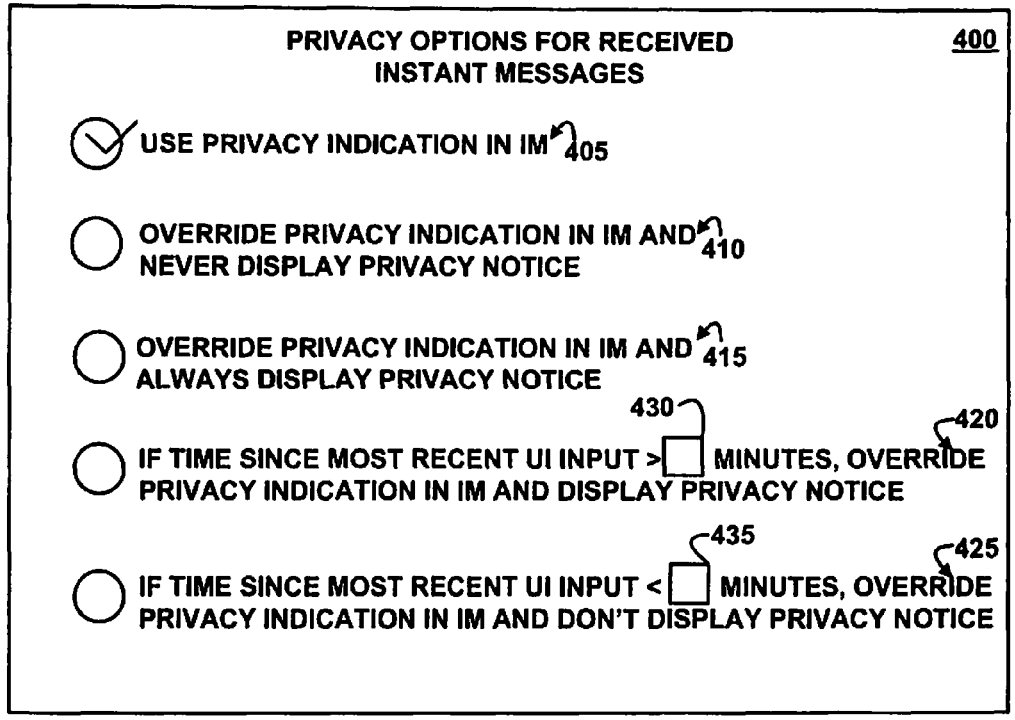
FIG. 4A depicts a block diagram of an example user interface at a client for privacy options for received instant messages, according to an embodiment of the invention.

FIG. 4A depicts a block diagram of an example privacy options user interface 400 for received instant messages at a client device, according to an embodiment of the invention. An instant messaging client 160 presents the privacy options user interface 400 via the user interface I/O device 121 connected to the client device 100 or 132. The privacy options user interface 400 includes privacy options 405, 410, 415, 420, and 425, one of which may be selected by a user via the user interface I/O device 121 and sent to the instant messaging client 160. The privacy options 405, 410, 415, 420, and 425 specify requests to use or override (ignore) the privacy indication in a received instant message if the instant message allows its privacy indication to be overridden. In an embodiment, the instant messaging client 160 uses the privacy option selected by the user when deciding whether to present the privacy notice 315 (FIG. 3A). In another embodiment, the privacy options user interface 400 is not present or not used, or the default privacy option is used, which is the option 405.

In response to selection by the user, the privacy option 405 requests the instant messaging client 160 to use the privacy indication in a received instant message 164 when deciding whether to present the privacy notice 315. That is, the privacy option 405 requests the user's instant messaging client 160 (the instant messaging client 160 that is receiving the privacy option 405) to present the privacy notice 315 if requested by the privacy indication in the received instant message 164, but to present the data in lieu of the privacy notice 315 if requested by the privacy indication in the received instant message 164.

In response to selection by the user, the privacy option 410 requests the instant messaging client 160 to override or ignore the privacy indication in a received instant message 164 and to never display the privacy notice 315. That is, the privacy option 405 requests the user's instant messaging client 160 to always present the data of the received instant messages 164 and to never present the privacy notice 315, regardless of whether the privacy indication in the instant message 164 specifies that the data is private or not.

In response to selection by the user, the privacy option 415 requests the instant messaging client 160 to override or ignore the privacy indication in a received instant message 164 and to always display the privacy notice 315, regardless of whether the privacy indication requests a privacy notice 315 or not.

In response to selection by the user, the privacy option 420 requests the instant messaging client 160 to override or ignore the privacy indication in a received instant message 164 and display the privacy notice 315 if the amount of time since the most recent user input activity received by the user interface I/O device 121 is greater than a threshold amount of time 430. In various embodiments, user input activity may include any input from any user input device 121, such as a keystroke input from a keyboard, a mouse click, a mouse movement, or any other user input activity. Thus, if the option 420 is selected and the amount of inactive time is greater than the threshold amount of time 430, then the privacy notice 315 is presented, regardless of the contents of the privacy indication in the received instant message 164. But, if the option 420 is selected and the amount of inactive time is less than or equal to the threshold amount of time 430, then the instant messaging client 160 uses the privacy indication in the received instant message 164; that is, the instant messaging client 160 presents or does not present the privacy notice 315, depending on the contents of the privacy indication in the received instant message 164.

In response to selection by the user, the privacy option 425 requests the instant messaging client 160 to override or ignore the privacy indication in a received instant message 164 and to not display the privacy notice 315 if the amount of time since the most recent user input activity received by the user interface I/O device 121 is less than a threshold amount of time 435. Thus, if the option 425 is selected and the amount of inactive time is less than the threshold amount of time 435, then the data of the instant message 164 is presented without a privacy notice 315, regardless of the contents of the privacy indication in the received instant message 164. But, if the option 425 is selected and the amount of inactive time is greater than or equal to the threshold amount of time 435, then the instant messaging client 160 uses the privacy indication in the received instant message 164; that is, the instant messaging client 160 presents or does not present the privacy notice 315, depending on the contents of the privacy indication in the received instant message 164.

Figure 4B:
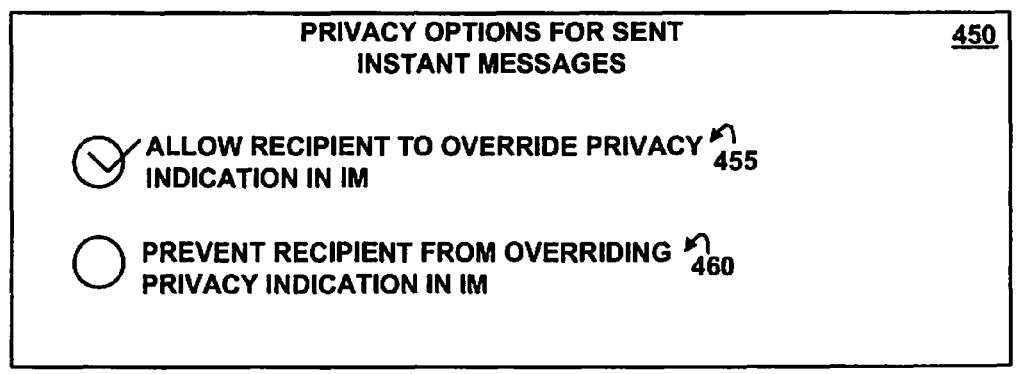
FIG. 4B depicts a block diagram of an example user interface at a client for privacy options for sent instant messages, according to an embodiment of the invention.

FIG. 4B depicts a block diagram of an example privacy options user interface 450 for received instant messages at a client device, according to an embodiment of the invention. An instant messaging client 160 presents the privacy options user interface 450 via the user interface I/O device 121 connected to the client device 100 or 132. The privacy options user interface 450 includes privacy options 455 (allow recipient to override privacy indications) and 460 (prevent recipient from overriding privacy indications), one of which may be selected by a user via the user interface I/O device 121 and sent to the instant messaging client 160. In an embodiment, the sending instant messaging client adds the privacy option 455 or 460 to instant messages that the sending instant message client 160 sends, which instructs the receiving instant message client to allow or disallow overrides (selected by the recipient via the user interface 400 of FIG. 4A) to a privacy indication in the instant message.

Figure 5:
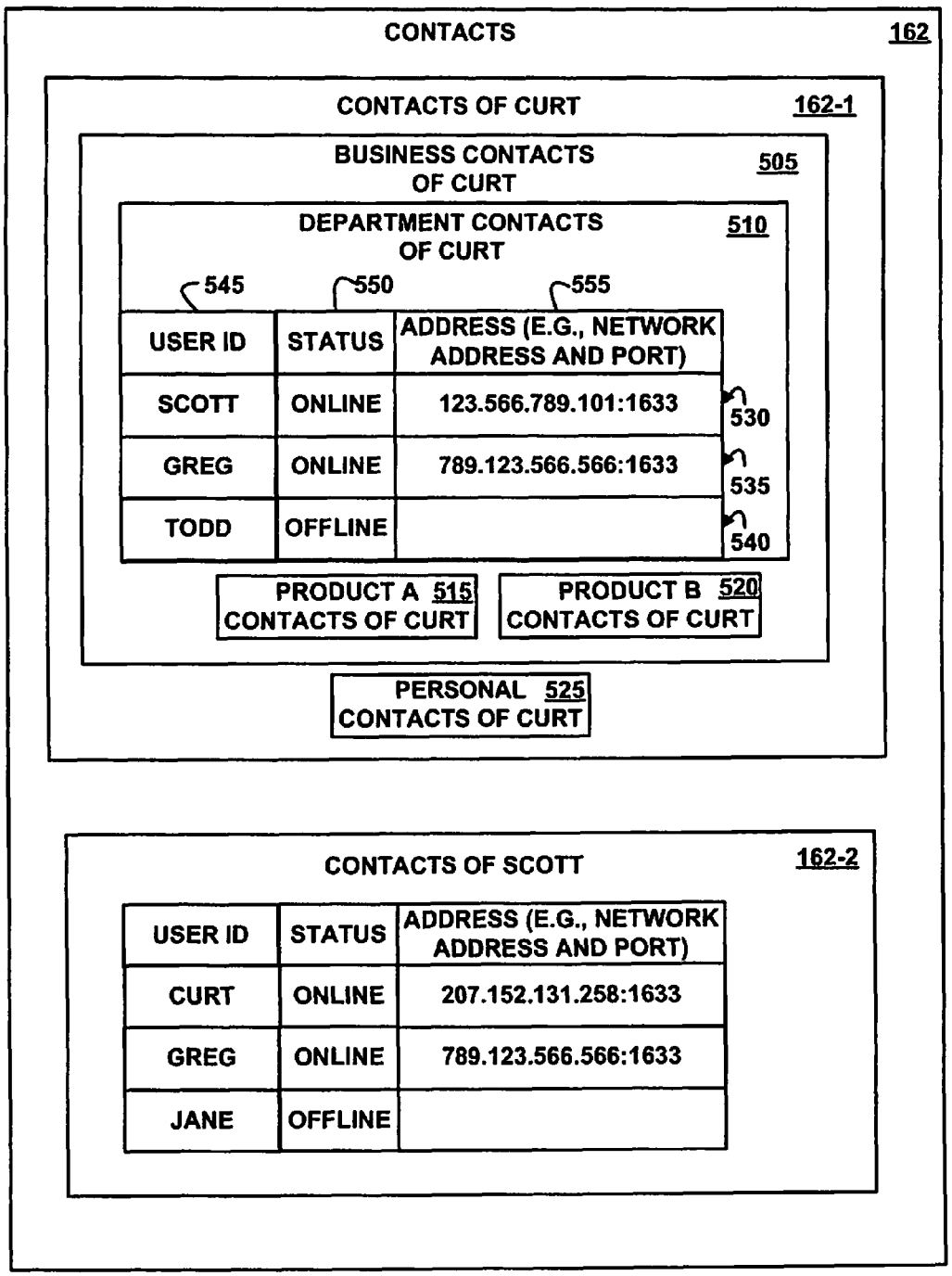
FIG. 5 depicts a block diagram of a data structure for example contacts, according to an embodiment of the invention.

FIG. 5 depicts a block diagram of a data structure for example contacts 162, according to an embodiment of the invention. The contacts 162 includes example contacts 162-1 and 162-2, each of which is associated with a different user. The contacts 162-1 include a hierarchy of contacts 505, 510, 515, 520, and 525. The contacts 162-1 includes the contacts 505 and 525. The contacts 505 includes the contacts 510, 515, and 520.

The contacts 510 includes example records 530, 535, 540, each of which includes a user identifier 545, a connection status 550, and an address 555. The user identifier 545 identifies a user that interacts with the client device 100 or 132. The connection status 550 includes presence information for the respective user 545, such as whether the user 545 is currently online or offline. In an embodiment, the respective user 545 is online if the instant messaging client 160 is executing that sends instant messages 164 from the user (the user is the sender), that receives instant messages 164 for the user (the user is the recipient), and that opened a session with the instant messaging service provider 170. The address 555 identifies the client device 100 or 132 with which the user interacts (e.g. an address with the network, such as an IP (Internet Protocol address)) and also optionally identifies the instant messaging client 160 that processes the user's sent and received instant messages 164 (e.g. a port that the instant messaging client 160 monitors or receives data from and sends data to).

The contacts 162-2 illustrates an embodiment where the contacts are not hierarchical.

Figure 6:
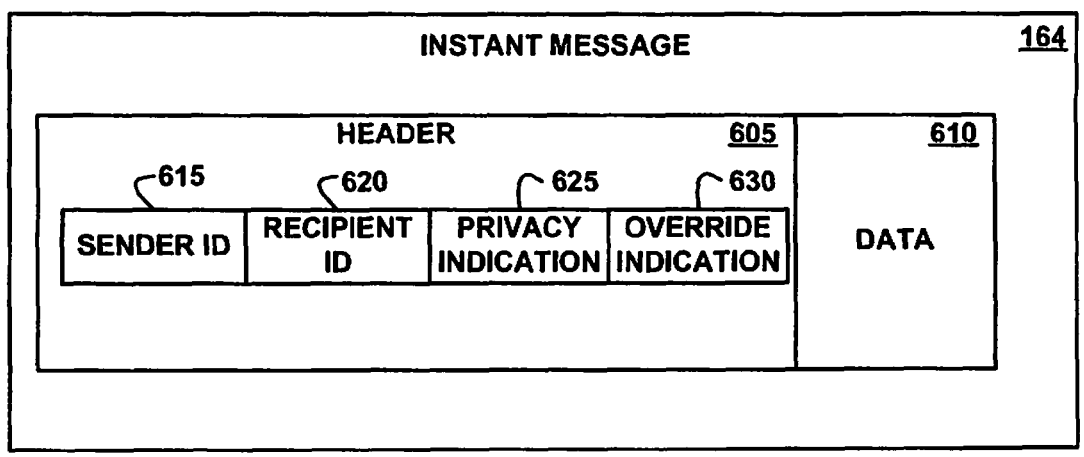
FIG. 6 depicts a block diagram of a data structure for an example instant message, according to an embodiment of the invention.

FIG. 6 depicts a block diagram of a data structure for an example instant message 164, according to an embodiment of the invention. The instant message 164 typically includes a header 605 and data 610. The instant message 164 may also include other components that are ordinarily not viewed by users.

The header 605 includes a sender identifier 615, a recipient identifier 620, a privacy indication 625, and an override indication 630. The sender identifier 615 identifies the sender that transmitted or sent the instant message 164, which in various embodiments may include the name or identifier of the sending user, an identifier of the sending instant messaging client 160, an identifier of the sending client device 100 or 132, and/or a network address and/or port of the client device 100 or 132, any combination thereof, or any other appropriate identifiers. The recipient identifier 620 identifies the recipient that receives or is intended to receive the instant message 164, which in various embodiments may include the name or identifier of the recipient user, an identifier of the recipient instant messaging client 160, an identifier of the recipient client device 100 or 132, and/or a recipient network address and/or port of the recipient client device 100 or 132, any combination thereof, or any other appropriate identifiers.

The privacy indication 625 specifies that the sender considers the data 610 to be private or confidential and recommends or requests that the recipient instant message client 160 present a privacy notice 315 and hide the data 610 (make the data 610 unavailable) until the recipient user acknowledges the privacy notice 315. The override indication indicator 630 specifies whether the sender of the instant message 164 allows or disallows the recipient instant message client 160 to ignore or override the contents of the privacy indication 625.

The data 610 may include text messages, optional file attachments, graphics, or video capable of being transmitted over the network 130 between the client devices 100 and 132 via the network 130. The data 610 is capable of being entered or selected by the sending user and presented via the user interface I/O device 121. The data 610 generically refers to the data 250, 260, and/or 358.

Figure 7:
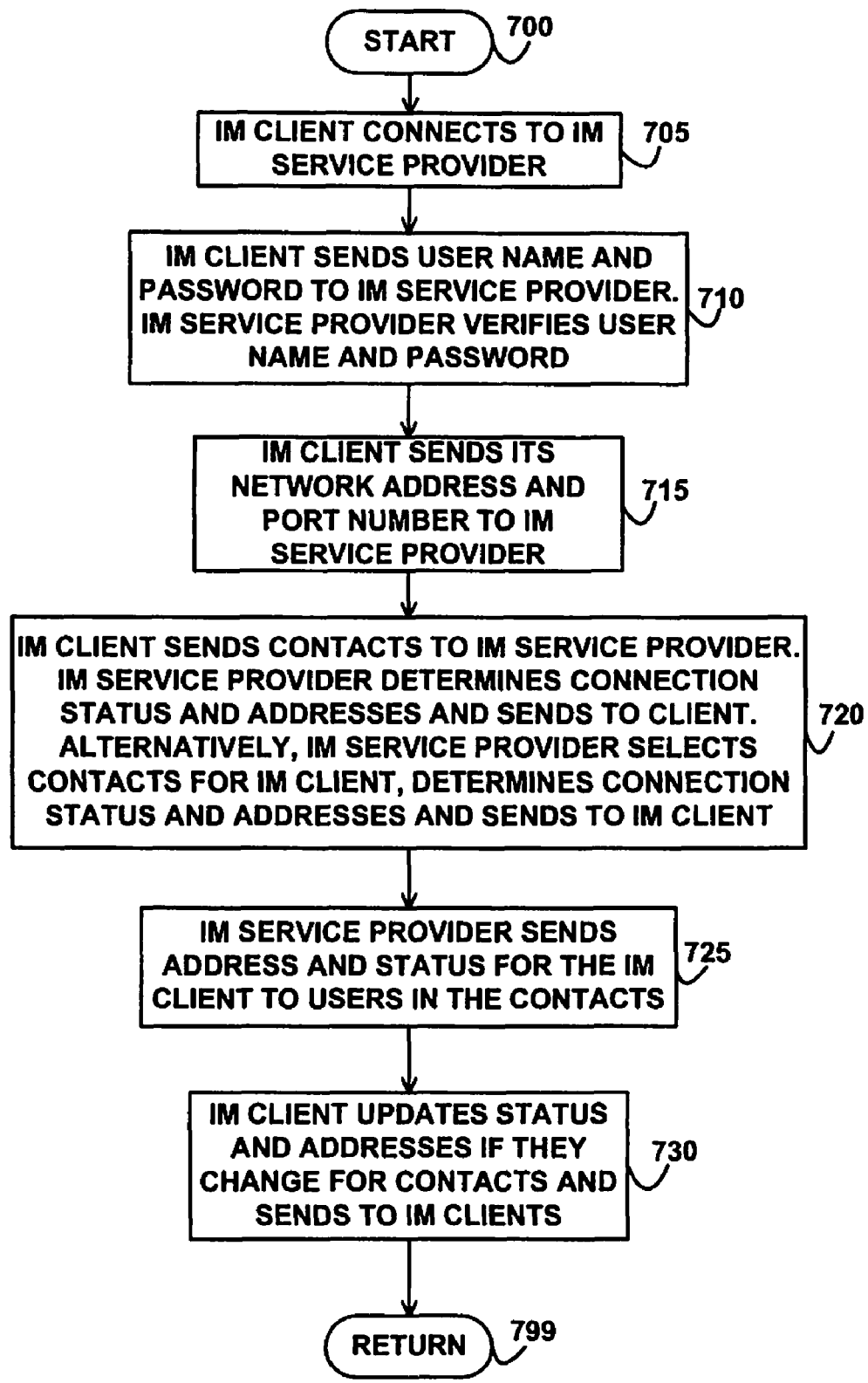
FIG. 7 depicts a flowchart of example processing for creating an instant message session, according to an embodiment of the invention.

FIG. 7 depicts a flowchart of example processing for creating an instant message session and/or creating an online presence for a user, according to an embodiment of the invention. Control begins at block 700. Control then continues to block 705 where the instant messaging client 160 connects to the instant messaging service provider 170. Control then continues to block 710 where the instant messaging client 160 sends a log-on request with a user name and password to the instant messaging service provider 170, which verifies the user name or other identifier and password against the information in the registration data 172. In various embodiments, the actions of blocks 705 and 710 may be performed in response to an explicit request from the user or automatically at power on of the client device 100 or 132 on which the instant messaging client 160 executes, or in response to the start of execution of the instant messaging client 160.

Control then continues to block 715 where the instant messaging client 160 sends the network address and port number of the client device 100 or 132 and the instant messaging client 160 to the instant messaging service provider 170. In an embodiment, the network address is an IP (Internet Protocol) address, and the port number identifies the endpoint to a logical connection, such as the instant messaging client 160 that monitors or sends and receives instant messages 164 to/from the port.

Control then continues to block 720 where the instant messaging client 160 sends its contacts (the contacts 162-1 or 162-2) to the instant messaging service provider 170. The instant messaging service provider 170 determines the connection status (e.g., online and able to receive instant messages 164 or offline and not able to receive instant messages 164) and sends the connection status for the names in the contacts to the instant message client 160. In another embodiment, the instant messaging service provider 170 selects contacts from the contacts 162 for the user, determines their connection status, and sends the selected contacts (as the contacts 162-1 or 162-2) to the instant messaging client 160. Control then continues to block 725 where the instant messaging service provider 170 sends the address and connection status for the user that connected at block 705 and is now online to the users identified in the contacts. Control then continues to block 730 where the instant messaging service provider 170 updates the connection status for the clients if they should change sends them to the instant messaging client 160. Control then continues to block 799 where the logic of FIG. 7 returns.

Figure 8:
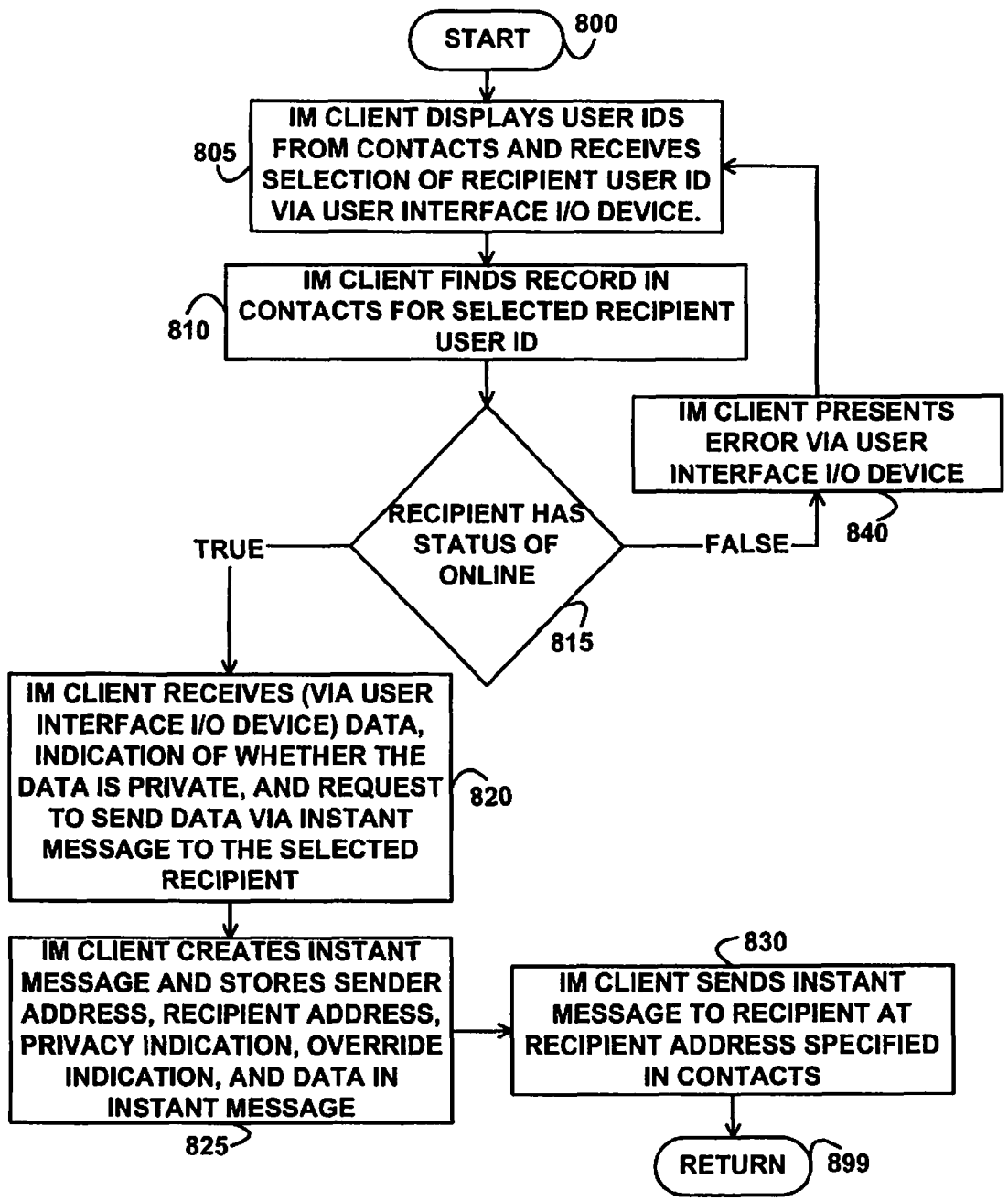
FIG. 8 depicts a flowchart of example processing for sending an instant message, according to an embodiment of the invention.

FIG. 8 depicts a flowchart of example processing for sending an instant message 164 from a sending instant message client to a recipient instant messaging client, according to an embodiment of the invention. Control begins at block 800. Control then continues to block 805 where the sending instant messaging client 160 presents user identifiers or names from the contacts of the sender and receives selection of a recipient user identifier via the user interface I/O device 121. Control then continues to block 810 where the instant messaging client 160 finds the record in the contacts for the selected recipient user identifier. Control then continues to block 815 where the instant messaging client 160 determines whether the selected recipient user has a connection status 550 of online, indicating that the recipient is connected to the network and capable of receiving an instant message 164.

If the determination at block 815 is true, then the selected recipient is online, so control continues to block 820 where the instant messaging client 160 receives data via the message input field 210, a request to send the data in an instant message 164 to the selected recipient, and an indication of whether the data is private via the send private command 215 (private) or the send command 220 (non-private) using the user interface I/O device 121. Control then continues to block 825 where the instant messaging client 160 creates the instant message 164 and stores the sender identifier 615, the recipient identifier 620, the privacy indication 625, and the override indication 620 (from the privacy option 455 or 460) and the data 610 into the instant message 164. Control then continues to block 830 where the instant messaging client 160 sends the instant message 164 to the selected recipient at the address of the recipient listed in the contacts. Control then continues to block 899 where the logic of FIG. 8 returns.

If the determination at block 815 is false, then the selected recipient does not have a connection status 550 of online, so control continues to block 840 where the instant messaging client 160 presents an error via the user interface I/O device 121. Control then returns to block 805, as previously described above. In another embodiment, the instant messaging client 160 and/or the instant messaging service provider 170 do not provide presence information, and the instant messaging client 160 sends instant messages 164 to intended recipients without knowing whether they are online.

Figure 9:
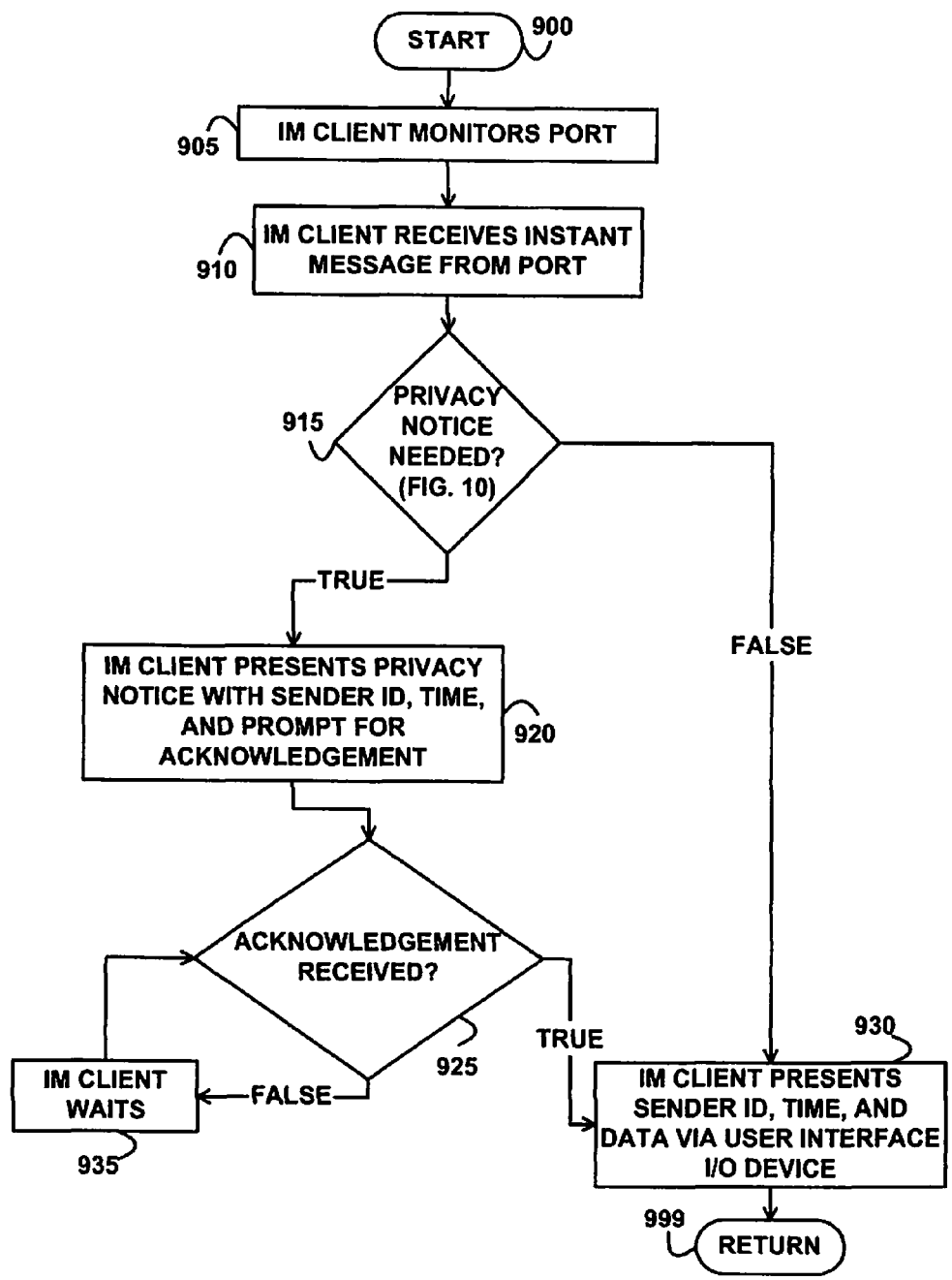
FIG. 9 depicts a flowchart of example processing for receiving an instant message, according to an embodiment of the invention.

FIG. 9 depicts a flowchart of example processing for receiving an instant message 164 by a recipient instant messaging client, according to an embodiment of the invention. Control begins at block 900. Control then continues to block 905 where the recipient instant messaging client 160 monitors its assigned port at the client device 100 or 132. Control then continues to block 910 where the instant messaging client 160 receives an instant message 164 from the port. Control then continues to block 915 where the instant messaging client 160 determines whether a privacy notice 315 is needed, as further described below with reference to FIG. 10, which returns and indication of true or false.

If the determination at block 915 is true, then a privacy notice 315 is needed, so control continues to block 920 where the recipient instant messaging client 160 presents the privacy notice 315 in lieu of presenting or displaying the data 610, along with an identifier of the sender, a time that the instant message 164 was received (or sent), and an acknowledgment prompt 320. The instant messaging client 160 hides or refrains from displaying or presenting the data 610 of the received message 164, and does not make the data available to the recipient via the user input I/O device 121. Control then continues to block 925 where the instant messaging client 160 determines whether an acknowledgement to the privacy notice 315 was received from the user interface I/O device 121.

If the determination at block 925 is true, then an acknowledgement was received to the privacy notice 315, e.g. by an acknowledgment command generated by user selection of the acknowledgment prompt 320, so control continues to block 930 where the instant messaging client 160 presents the sender identifier, time, and data 610 via the user interface I/O device 121. Thus, the recipient instant message client 160 hides the data 610 until an acknowledgment of the privacy notice is received from the user input I/O device 121. Control then continues to block 999 where the logic of FIG. 9 returns.

If the determination at block 925 is false, then an acknowledgement was not received to the privacy notice 315, so control continues to block 935 where the instant messaging client 160 waits for an acknowledgement to the privacy notice 315. Control then returns to block 925, as previously described above.

If the determination at block 915 is false, then the privacy notice 315 is not needed, so control continues to block 930, as previously described above.

Figure 10:
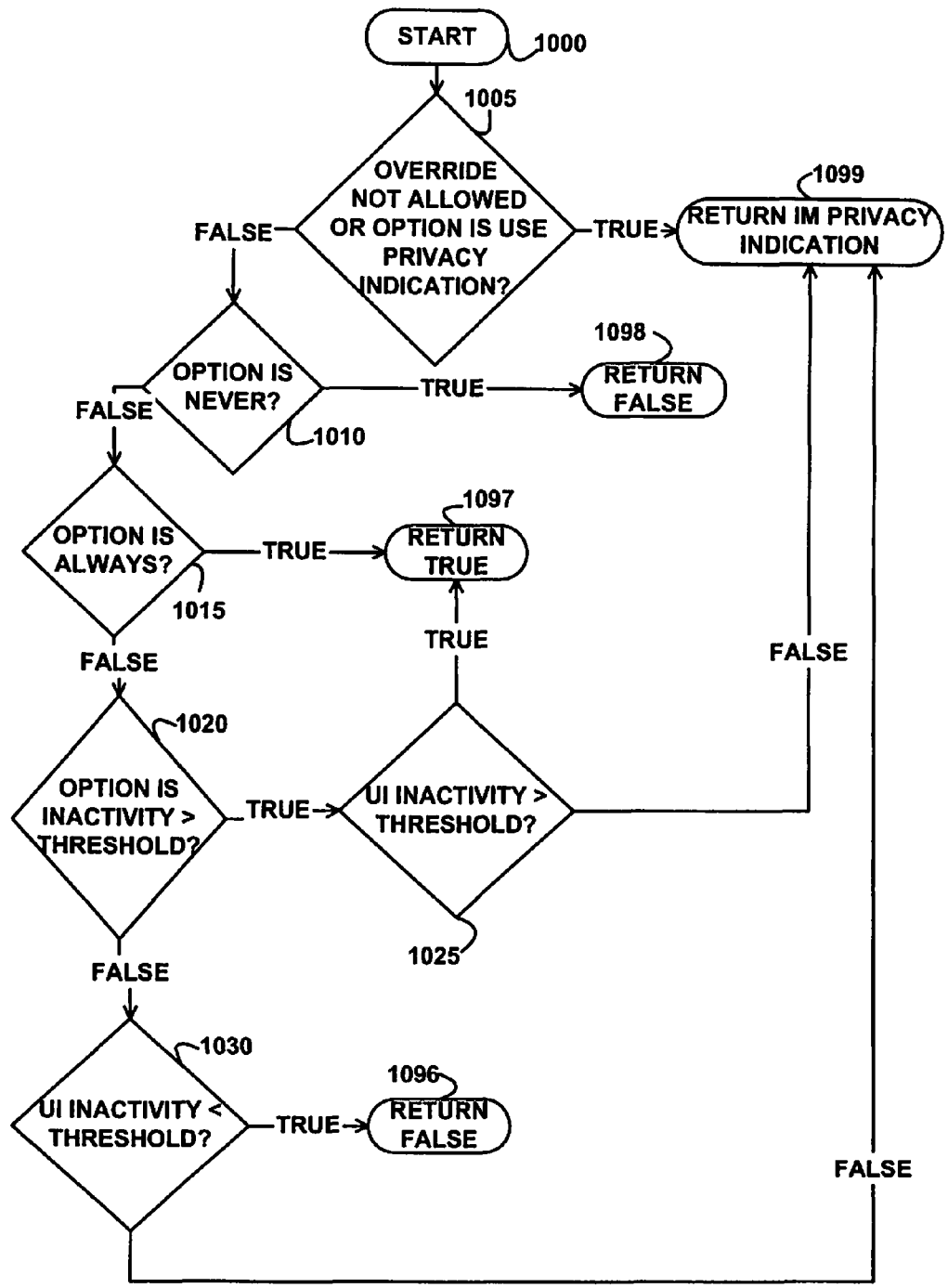
FIG. 10 depicts a flowchart of example processing for determining whether a privacy notice is needed, according to an embodiment of the invention.

FIG. 10 depicts a flowchart of example processing for determining whether a privacy notice 315 is needed, according to an embodiment of the invention. Control begins at block 1000. Control then continues to block 1005 where the instant messaging client 160 determines whether the override indication 630 disallows or prevents overriding the privacy indication 625 or whether the privacy option 405 was selected via the user interface 400 indicating that the privacy indication 625 is to be used. If the determination at block 1005 is true, then the sender disallows overrides (via the override indication 630) of the privacy indication 625 or the privacy option 405 was selected indicating that the privacy indication 625 is to be used, so control continues to block 1099 where the logic of FIG. 10 returns the contents of the privacy indication 625, which specifies true (the privacy notice is needed) or false (the privacy notice is not needed).

If the determination at block 1005 is false, then the override indication 630 allows the privacy indication 625 to be overridden or ignored and the privacy option 405 was not selected, so control continues to block 1010 where the instant messaging client 160 determines whether the privacy option 410 was selected indicating that the privacy notice 315 is never to be presented. If the determination at block 1010 is true, then the privacy notice 315 is never to be presented, so control continues to block 1098 where the logic of FIG. 10 returns false, indicating that the privacy notice is not needed. Returning false causes the recipient instant messaging client 160 to present the data 610 even if the privacy indication 625 specifies that the data 160 is private because the override indication 630 allows the privacy indication 625 to be overridden or ignored.

If the determination at block 1010 is false, then the privacy option 410 was not selected, so control continues to block 1015 where the instant messaging client 160 determines whether the privacy option 415 was selected indicating that the privacy notice 315 is always to be presented. If the determination at block 1015 is true, then the privacy notice 315 is always to be presented, so control continues to block 1097 where the logic of FIG. 10 returns true, indicating that the privacy notice is needed.

If the determination at block 1015 is false, then the privacy option 415 was not selected, so control continues to block 1020 where the instant messaging client 160 determines whether the privacy option 420 was selected. If the determination at block 1020 is true, then the privacy option 420 was selected, so control continues to block 1025 where the instant messaging client 160 determines whether the amount of time since the most recent user input activity received by the user interface I/O device 121 that is being used by the recipient is greater than a threshold amount of time 430. If the determination at block 1025 is true, then the amount of time since the most recent user input activity received by the user interface I/O device 121 that is being used by the recipient is greater than a threshold amount of time 430, so control continues to block 1097 where the logic of FIG. 10 returns true, indicating that the privacy notice 315 is needed. Returning true causes the instant messaging client 160 to present the privacy notice 315 and hide the data 610 even if the privacy indication 625 specifies that the data 610 is non-private because the override indication 630 allows the privacy indication 625 to be overridden or ignored, and a time period since a user interface device 121 received input is greater than the threshold amount time 430.

If the determination at block 1025 is false, then the amount of time since the most recent user input activity received by the user interface I/O device 121 that is being used by the recipient is not greater than the threshold amount of time 430, so control continues to block 1099 where the logic of FIG. 10 returns the privacy indication 625.

If the determination at block 1020 is false, then the privacy option 425 was selected, so control continues to block 1030 where the instant messaging client 160 determines whether the amount of time since the most recent user input activity received by the I/O interface device 121 used by the recipient is less than the threshold amount of time 435. If the determination at block 1030 is true, then the amount of time since the most recent user input activity received by the I/O interface device 121 used by the recipient is less than the threshold amount of time 435, so control continues to block 1096 where the logic of FIG. 10 returns false, indicating that the privacy notice is not needed. The returning of false by block 1096 causes the instant message client 160 to present the data 160 without a privacy notice 315 even if the privacy indication 625 specifies that the data 610 is private because the override indication 630 allows the privacy indication 625 to be overridden or ignored, and a time period since the user interface device 121 most-recently received input is less than the threshold amount of time 435.

If the determination at block 1030 is false, then the amount of time since the most recent user input activity received by the I/O interface device 121 used by the recipient is not less than the threshold amount of time 435, so control continues to block 1099 where the logic of FIG. 10 returns the privacy indication 625.

Figure 11:
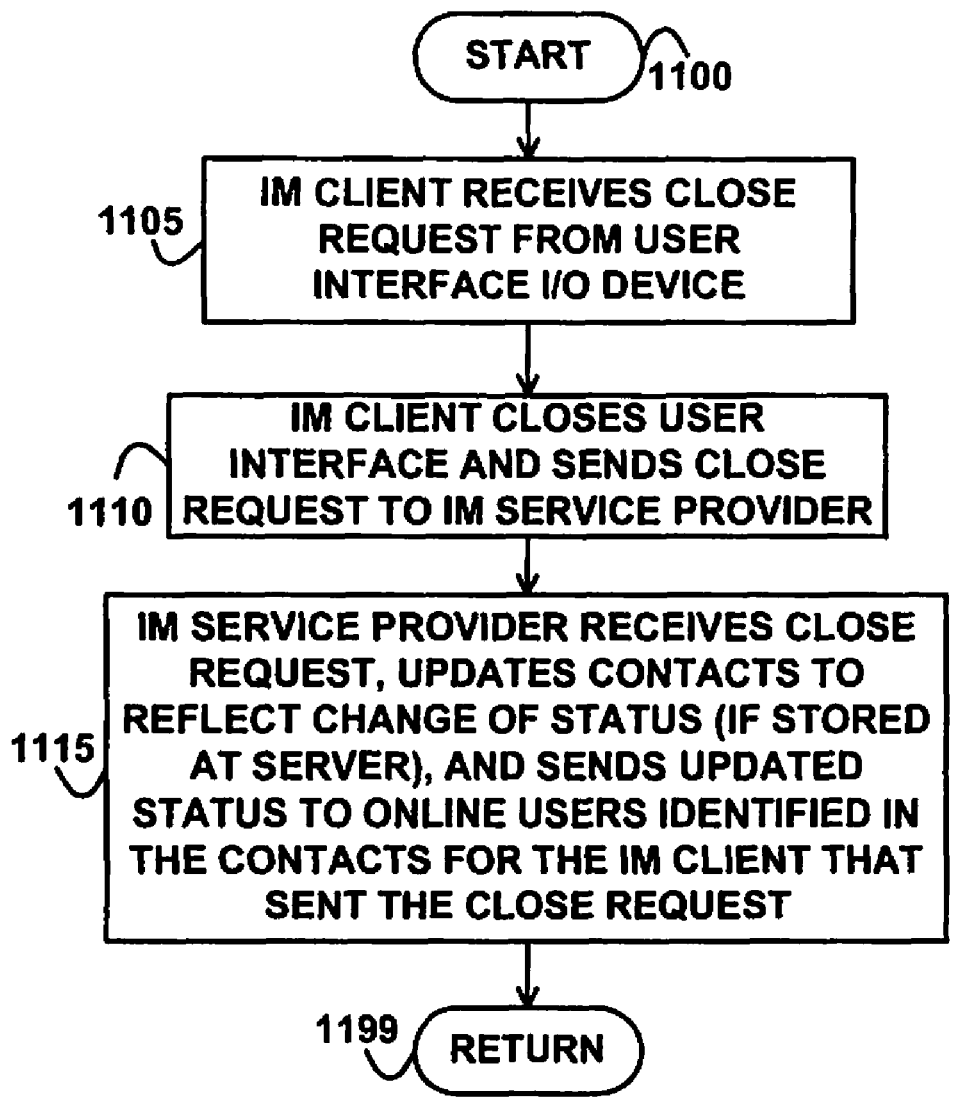
FIG. 11 depicts a flowchart of example processing for closing an instant messaging session, according to an embodiment of the invention.

FIG. 11 depicts a flowchart of example processing for closing an instant messaging session, according to an embodiment of the invention. Control begins at block 1100. Control then continues to block 1105 where the instant messaging client 160 receives a close request from the user interface I/O device 121, e.g., via the close command 225 (FIG. 2). Control then continues to block 1110 where, in response to the close request, the instant messaging client 160 closes the user interface and sends a close request to the instant messaging service provider 170.

Control then continues to block 1115 where the instant messaging service provider 170 receives the close request, and in response, updates the connection status 550 in the contacts for the user identifier that initiated the close request to indicate that the user is offline. The instant messaging service provider 170 further sends the connection status 550 for the offline user to the other users in the contacts (that have a connection status 550 of online) via their respective addresses, and the instant messaging clients 160 for the other users change the connection status 550 in their contacts to offline for the instant messaging client 160 that sent the close request. The instant messaging session for the instant messaging client 160 that sent the close request is now closed. Control then continues to block 1199 where the logic of FIG. 11 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention. Different instances of the word "embodiment" as used within this specification do not necessarily refer to the same embodiment, but they may.

Any data, data values, data structures, and names or identifiers of fields or data structures illustrated or described herein are examples only, and in other embodiments, different names, identifiers, amounts of data, data values, types of data, fields, numbers and types of fields, field names, data structure names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
receiving an instant message at a recipient client device from a sender, wherein the instant message comprises data and a privacy indication that specifies whether the data is private, and an override indication that specifies whether the privacy indication is allowed to be overridden;
determining, at the recipient client device, whether to present a privacy notice at the recipient client device based on the privacy indication and the override indication, wherein the determining further comprises deciding to present the data if the privacy indication specifies that the data is private, the override indication allows the privacy indication to be overridden, and a time period since a user interface device at the recipient client device received a most recent user input is less than a threshold amount of time, wherein the time period was received from a user interface at the user interface device at the recipient client device;
presenting the data at the recipient client device and not presenting the privacy notice at the recipient client device if the privacy indication specifies that the data is private, the override indication allows the privacy indication to be overridden, and the time period since the user interface device at the recipient client device received the most recent user input is less than the threshold amount of time; and
presenting the privacy notice at the recipient client device and hiding the data from presentation at the recipient client device if the privacy indication specifies that the data is private, the override indication allows the privacy indication to be overridden, and the time period since the user interface device at the recipient client device received the most recent user input is greater than the threshold amount of time, wherein the privacy notice explains that the data that is hidden is private.

2. The method of claim 1, wherein the presenting the privacy notice at the recipient client device and hiding the data from presentation at the recipient client device further comprises:
hiding the data until an acknowledgment of the privacy notice is received, wherein the data is presented in response to the acknowledgment.

3. The method of claim 2, further comprising:
in response to receiving the acknowledgment that comprises a cursor positioned at the privacy notice, presenting a fly-over message that comprises the data.

4. The method of claim 2, wherein the acknowledgement comprises a request for presentation of the data.

5. The method of claim 1, wherein a sending client that sends the instant message receives the privacy indication from a user interface and stores the privacy indication in the instant message.

6. The method of claim 1, wherein the presenting the privacy notice at the recipient client device further comprises:
presenting an identifier of a sender of the instant message at the recipient client device.

7. A computer-readable storage medium encoded with instructions, wherein the instructions when executed comprise:
receiving an instant message at a recipient client device from a sender, wherein the instant message comprises data, a privacy indication that specifies whether the data is private, and an override indication that specifies whether the privacy indication is allowed to be overridden;
determining, at the recipient client device, whether to present a privacy notice at the recipient client device based on the privacy indication and the override indication, wherein the determining further comprises deciding to present the data if the privacy indication specifies that the data is private, the override indication allows the privacy indication to be overridden, and a time period since a user interface device at the recipient client device received a most recent user input is less than a threshold amount of time, wherein the time period was received from a user interface at the user interface device at the recipient client device;
presenting the data at the recipient client device and not presenting the privacy notice at the recipient client device if the privacy indication specifies that the data is private, the override indication allows the privacy indication to be overridden, and the time period since the user interface device at the recipient client device received the most recent user input is less than the threshold amount of time; and
presenting the privacy notice at the recipient client device instead of the data until an acknowledgment of the privacy notice is received if the privacy indication specifies that the data is private, the override indication allows the privacy indication to be overridden, and the time period since the user interface device at the recipient client device received the most recent user input is greater than the threshold amount of time wherein the privacy notice explains that the data is private.

8. The computer-readable storage medium of claim 7, wherein the presenting the privacy notice further comprises:
presenting an identifier of a sender of the instant message; and
prompting for the acknowledgment.

9. The computer-readable storage medium of claim 7, wherein the determining further comprises:
deciding to present the privacy notice if the privacy indication specifies that the data is private and the override indication specifies that the privacy indication is not allowed to be overridden.

10. The computer-readable storage medium of claim 7, wherein the determining further comprises:
deciding to present the privacy notice if the privacy indication specifies that the data is private and a privacy option requests that the privacy indication be used.

11. The computer-readable storage medium of claim 7, wherein the determining further comprises:
deciding to present the data if the privacy indication specifies that the data is private, the override indication allows the privacy indication to be overridden, and a privacy option requests overriding the privacy indication.

12. The computer-readable storage medium of claim 7, wherein the determining further comprises:
deciding to present the privacy notice if the privacy indication specifies that the data is non-private, the override indication allows the privacy indication to be overridden, and the time period since the user interface device received the most recent user input is greater than the threshold amount of time.

13. A client device comprising:
a processor; and
memory connected to the processor, wherein the memory is encoded with instructions that when executed on the processor comprise:
receiving an instant message at the client device from a sender, wherein the instant message comprises data, a privacy indication that specifies whether the data is private, and an override indication that specifies whether the privacy indication is allowed to be overridden,
determining whether to present a privacy notice based on the privacy indication and the override indication, wherein the determining further comprises deciding to present the data at the client device if the privacy indication specifies that the data is private, the override indication allows the privacy indication to be overridden, and a time period since a user interface device at the client device received a most recent user input is less than a threshold amount of time, wherein the time period was received from a user interface at the user interface device at the client device,
presenting the data at the client device and hiding the data from presentation at the client device if the privacy indication specifies that the data is private, the override indication allows the privacy indication to be overridden, and the time period since the user interface device at the client device received the most recent user input is greater than the threshold amount of time, and
presenting the privacy notice at the client device instead of the data until an acknowledgment of the privacy notice is received if the privacy indication specifies that the data is private, the override indication allows the privacy indication to be overridden, and the time period since the user interface device at the client device received the most recent user input is greater than the threshold amount of time, wherein the privacy notice explains that the data is private.

14. The client device of claim 13, wherein the presenting the privacy notice at the client device instead of the data until an acknowledgment of the privacy notice is received further comprises:
presenting an identifier of a sender of the instant message;
prompting for the acknowledgment while hiding the data;
receiving the acknowledgment; and
presenting the data in response to the receiving the acknowledgment.

15. The client device of claim 13, wherein the determining further comprises:
deciding to present the privacy notice at the client device if the privacy indication specifies that the data is private and the override indication specifies that the privacy indication is not allowed to be overridden.

16. The client device of claim 13, wherein the determining further comprises:
deciding to present the privacy notice at the client device if the privacy indication specifies that the data is private and a privacy option requests that the privacy indication be used.

17. The client device of claim 13, wherein the determining further comprises:
deciding to present the data at the client device if the privacy indication specifies that the data is private, the override indication allows the privacy indication to be overridden, and a privacy option requests overriding the privacy indication.

18. The client device of claim 13, wherein the determining further comprises:
deciding to present the privacy notice at the client device if the privacy indication specifies that the data is non-private, the override indication allows the privacy indication to be overridden, and the time since the user interface device received the most recent user input is greater than the threshold amount of time.

* * * * *